(12) United States Patent
Tanaka et al.

(10) Patent No.: US 7,567,222 B2
(45) Date of Patent: Jul. 28, 2009

(54) IN-VEHICLE DISPLAY APPARATUS AND DISPLAY CONTROL METHOD THEREFOR

(75) Inventors: Shinya Tanaka, Kobe (JP); Hironori Shiroto, Kobe (JP); Kiyoshi Hamatani, Kobe (JP); Kazuhiro Yoshiyama, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 337 days.

(21) Appl. No.: 11/583,076

(22) Filed: Oct. 19, 2006

(65) Prior Publication Data
US 2007/0129864 A1 Jun. 7, 2007

(30) Foreign Application Priority Data
Nov. 28, 2005 (JP) ............... 2005-341802

(51) Int. Cl.
G09G 5/00 (2006.01)
G06F 3/041 (2006.01)
(52) U.S. Cl. ............... 345/7; 345/173; 359/630
(58) Field of Classification Search ........... 345/7–9, 345/156, 173, 102
See application file for complete search history.

(56) References Cited

U.S. PATENT DOCUMENTS

| | | | |
|---|---|---|---|
| 5,381,684 A | 1/1995 | Kawamura |
| 5,450,292 A | 9/1995 | Yokoyama et al. |
| 5,453,855 A | 9/1995 | Nakamura et al. |
| 5,581,683 A | 12/1996 | Bertignoll et al. |
| 5,828,415 A | 10/1998 | Keating et al. |
| 5,936,596 A | 8/1999 | Yoshida et al. |
| 6,046,849 A | 4/2000 | Moseley et al. |
| 6,055,013 A | 4/2000 | Woodgate et al. |
| 6,055,103 A | 4/2000 | Woodgate et al. |
| 6,104,451 A | 8/2000 | Matsuoka et al. |
| 6,108,060 A | 8/2000 | Funamoto et al. |
| 6,377,295 B1 | 4/2002 | Woodgate et al. |
| 6,437,915 B2 | 8/2002 | Moseley et al. |
| 6,512,607 B1 | 1/2003 | Windsor et al. |
| 6,545,655 B1 | 4/2003 | Fujikawa |
| 6,624,863 B1 | 9/2003 | Jacobs et al. |

(Continued)

FOREIGN PATENT DOCUMENTS

EP 0 829 744 A2 3/1998

(Continued)

OTHER PUBLICATIONS

S. Tanaka et al., "Display Apparatus," U.S. Appl. No. 11/520,748, filed Sep. 14, 2006.

(Continued)

*Primary Examiner*—Kevin M Nguyen
(74) *Attorney, Agent, or Firm*—Oliff & Berridge, PLC

(57) ABSTRACT

An in-vehicle display apparatus includes a display portion that respectively displays images on a first screen for a driver and on a second screen for a front passenger on a common display to be visible from a viewing angle of the driver and another viewing angle from the front passenger, and further includes an operating portion, a signal outputting portion, a signal receiving portion, an operator detecting portion, and a controller. The signal receiving portion receives signals from the signal outputting portion, when the driver or the front passenger touches the operating portion.

13 Claims, 17 Drawing Sheets

U.S. PATENT DOCUMENTS

| | | |
|---|---|---|
| 6,628,352 B1 | 9/2003 | Sumida et al. |
| 6,731,416 B2 | 5/2004 | Hazzard |
| 6,954,185 B2 * | 10/2005 | Ogino .......................... 345/7 |
| 6,960,001 B2 | 11/2005 | Nitto et al. |
| 7,030,944 B2 | 4/2006 | Fujimoto |
| 7,077,526 B2 | 7/2006 | Overmann et al. |
| 7,151,532 B2 | 12/2006 | Schulz |
| 7,167,222 B2 | 1/2007 | Inoue et al. |
| 7,250,710 B2 | 7/2007 | Gilmour et al. |
| 7,292,296 B2 | 11/2007 | Kanbe et al. |
| 7,337,450 B2 | 2/2008 | Sato et al. |
| 7,354,163 B2 | 4/2008 | Suzuki et al. |
| 2001/0043302 A1 | 11/2001 | Inoue et al. |
| 2002/0001128 A1 | 1/2002 | Moseley et al. |
| 2003/0085659 A1 | 5/2003 | Overmann et al. |
| 2003/0142249 A1 | 7/2003 | Fujimoto |
| 2004/0119896 A1 | 6/2004 | Kean et al. |
| 2004/0263060 A1 | 12/2004 | Gilmour et al. |
| 2004/0263717 A1 | 12/2004 | Hsu et al. |
| 2005/0052529 A1 | 3/2005 | Mashitani et al. |
| 2005/0111100 A1 | 5/2005 | Mather et al. |
| 2005/0174658 A1 | 8/2005 | Long et al. |
| 2006/0066507 A1 * | 3/2006 | Yanagisawa .................. 345/7 |
| 2006/0191177 A1 * | 8/2006 | Engel .......................... 40/453 |
| 2006/0192746 A1 | 8/2006 | Ioki et al. |

FOREIGN PATENT DOCUMENTS

| | | |
|---|---|---|
| GB | 2 405 545 A | 3/2005 |
| GB | 2 405 546 A | 3/2005 |
| JP | A-05-055623 | 5/1993 |
| JP | A-05-246285 | 9/1993 |
| JP | A-6-186526 | 7/1994 |
| JP | A-6-236152 | 8/1994 |
| JP | A 7-103778 | 4/1995 |
| JP | A-9-46622 | 2/1997 |
| JP | A 10-123461 | 5/1998 |
| JP | A-10-130537 | 5/1998 |
| JP | A-11-52105 | 2/1999 |
| JP | A-11-52372 | 2/1999 |
| JP | A 11-84131 | 3/1999 |
| JP | A-11-088245 | 3/1999 |
| JP | A-11-95167 | 4/1999 |
| JP | A-11-109339 | 4/1999 |
| JP | A 11-248466 | 9/1999 |
| JP | A-11-331876 | 11/1999 |
| JP | A-11-339527 | 12/1999 |
| JP | A-2000-36927 | 2/2000 |
| JP | A-2000-47195 | 2/2000 |
| JP | A-2000-076838 | 3/2000 |
| JP | A-2000-137443 | 5/2000 |
| JP | A-2000-162979 | 6/2000 |
| JP | A-2000-180834 | 6/2000 |
| JP | A-2000-261731 | 9/2000 |
| JP | A-2001-083903 | 3/2001 |
| JP | A-2001-283926 | 10/2001 |
| JP | A-2001-311944 | 11/2001 |
| JP | A-2002-234399 | 8/2002 |
| JP | A-2003-121847 | 4/2003 |
| JP | A-2003-137005 | 5/2003 |
| JP | A-2003-196682 | 7/2003 |
| JP | A-2003-197018 | 7/2003 |
| JP | A-2003-337326 | 11/2003 |
| JP | B2 3503925 | 12/2003 |
| JP | A-2004-79488 | 3/2004 |
| JP | B2-3503925 | 3/2004 |
| JP | A-2004-233816 | 8/2004 |
| JP | A-2004-348204 | 12/2004 |
| JP | A 2005-71286 | 3/2005 |
| JP | A 2005-73076 | 3/2005 |
| JP | A 2005-78080 | 3/2005 |
| JP | A 2005-86773 | 3/2005 |
| JP | A-2005-255090 | 9/2005 |
| JP | A-2005-284592 | 10/2005 |
| JP | A-2005-313782 | 11/2005 |
| JP | A-2006-64733 | 3/2006 |
| JP | A-2006-076369 | 3/2006 |
| JP | A 2006-131227 | 5/2006 |
| JP | A 2006-151363 | 6/2006 |
| JP | A 2006-151364 | 6/2006 |
| KR | 10-2000-0008458 | 2/2000 |
| KR | 10-2005-0008173 | 1/2005 |
| WO | WO 97/42540 | 11/1997 |
| WO | WO 2004/011987 A1 | 2/2004 |
| WO | WO 2004/016460 A1 | 2/2004 |

OTHER PUBLICATIONS

S. Tanaka et al., "Display Apparatus and In-Vehicle Display Apparatus," U.S. Appl. No. 11/712,517, filed Mar. 1, 2007.
S. Tanaka et al., "Display Apparatus," U.S. Appl. No. 11/520,743, filed Sep. 14, 2006.
S. Tanaka, "Display Apparatus," U.S. Appl. No. 11/520,670, filed Sep. 14, 2006.
S. Tanaka, "Liquid Crystal Display Apparatus," U.S. Appl. No. 11/488,064, filed Jul. 18, 2006.
S. Tanaka, "Display Device and Display Method," U.S. Appl. No. 11/299,657, filed Dec. 13, 2005.
M. Maehata et al., "Receiver," U.S. Appl. No. 11/475,216, filed Jun. 27, 2006.
"Fujitsu Ten Technical Report", vol. 23, No. 2, Dec. 2005, pp. 22-27.
"Fujitsu Ten Technical Journal," No. 26, Jan. 2006, pp. 17-22.

* cited by examiner

FIG. 1
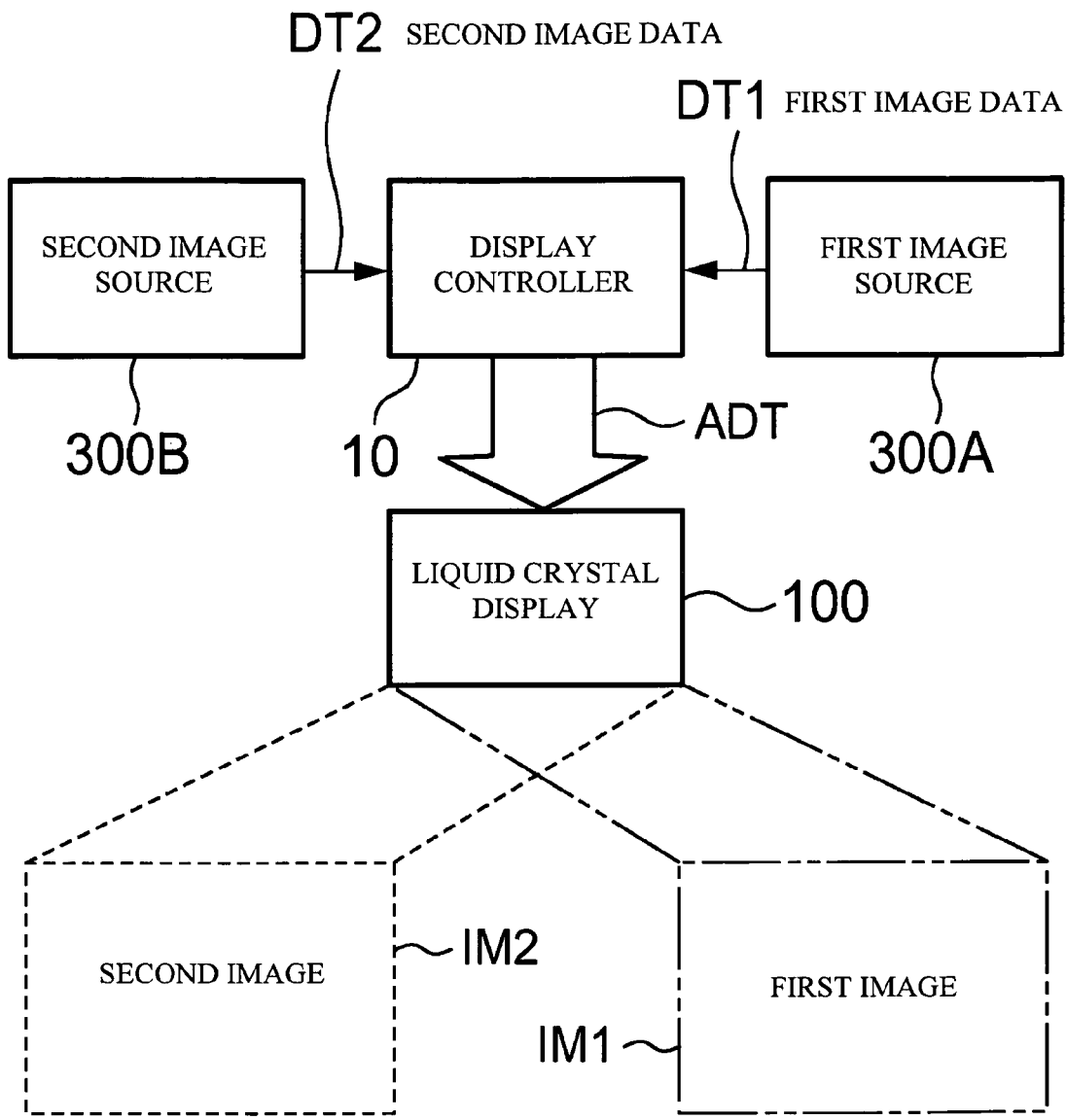
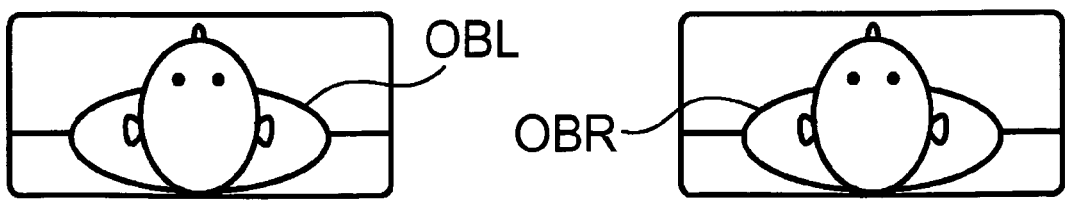

FIG. 18A
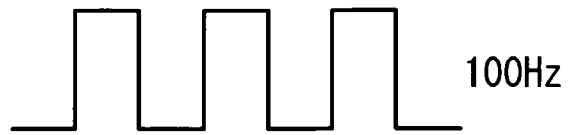
D-SEAT TRANSMITTER — 100Hz
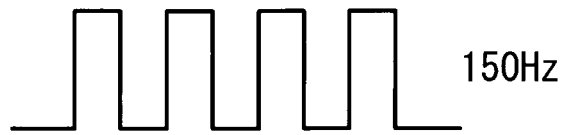
P-SEAT TRANSMITTER — 150Hz
FIG. 18B
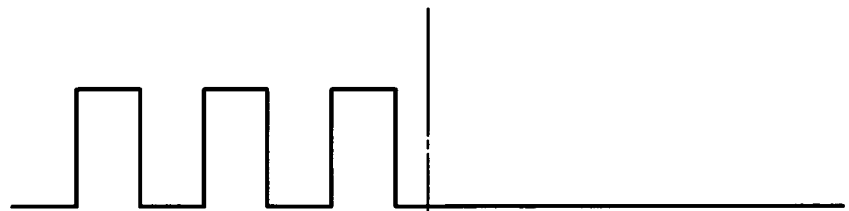
D-SEAT TRANSMITTER
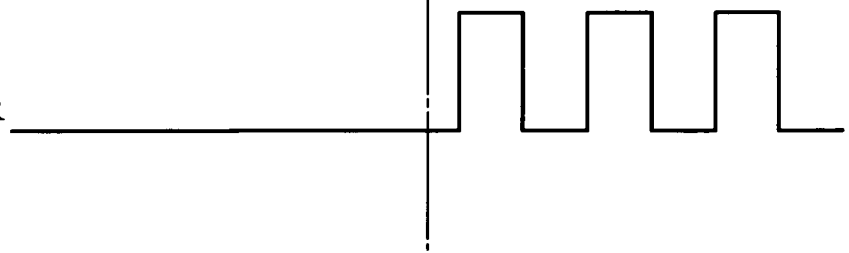
P-SEAT TRANSMITTER

IN-VEHICLE DISPLAY APPARATUS AND DISPLAY CONTROL METHOD THEREFOR

BACKGROUND OF THE INVENTION

1. Field of the Invention

This invention generally relates to an in-vehicle display apparatus arranged between the driver's seat and the front-passenger's seat in a vehicle to be operable from both the driver's seat and the front-passenger's seat.

2. Description of the Related Art

As a so-called multi-view display apparatus, on which different images are respectively visible from different viewing directions (viewing angles) on a common display panel, there has been known a multi-view display with a liquid crystal panel having a parallax barrier on the front side thereof. Different information (images) can be displayed to the right and left sides of the display screen by separating directions of lights through a backlight on a pixel basis (for example, as disclosed in Japanese Patent Application Publication No. 2005-78080). Such display apparatus is mounted in a vehicle, allowing the front-seat passenger to watch a TV program or another image, while the driver is checking a navigation map image.

It is not desirable in consideration of safety, if the driver is able to freely operate the navigation apparatus while driving, according to the display screen of the navigation apparatus. While the vehicle is moving, the operation is generally controlled by so-called restrictions on operation while driving. Under such restrictions, neither the driver nor the front-seat passenger is allowed to operate the navigation apparatus, thereby causing inconvenience. For this reason, there has been proposed a technique that detects which of the driver or the front-seat passenger has operated the apparatus, and the operation by the driver is not accepted (as disclosed in Japanese Patent Application Publication No. 11-248466).

It is to be noted that several methods can be imagined so that the driver who sits on the driver's seat (D-seat) and the front passenger who sits on the front-passenger's seat (P-seat) respectively operate or change the image for the driver's seat screen and that for the front-passenger's seat screen. For example, there may be provided manual operation buttons dedicated for the driver's seat screen and those dedicated for the front-passenger's seat screen. There may be provided a manual operation button to set the priority for operation to any one of the operation on the driver's seat screen and that on the front-passenger's seat screen.

If there are provided the manual operation buttons dedicated for the driver's seat screen and those dedicated for the front-passenger's seat screen, the number of necessary manual operation buttons is significantly increased as compared to that necessary for a single-view display apparatus. Also, if there is provided the manual operation button to set the priority for operation, a manual operation is necessary for setting the priority for operation, and in addition, another operation is necessary for selectively changing the priority for operation, resulting in a complex operation.

SUMMARY OF THE INVENTION

The present invention has been made in view of the above circumstances and provides a display apparatus in which a width of a chassis provided at sides of a display screen can be narrowed.

According to one aspect of the present invention, there is provided an in-vehicle display apparatus including: a display portion that respectively displays images on a first screen for a driver and on a second screen for a front passenger on a common display to be visible from a viewing angle of the driver and another viewing angle from the front passenger; an operating portion by which various functions are operated by use of the first screen for the driver and the second screen for the front passenger; a signal outputting portion that respectively output different signals from the driver and the front passenger; a signal receiving portion that receives the signals from the signal outputting portion; an operator detecting portion that detects which of the driver or the front passenger operates on the basis of the signals received by the signal receiving portion; and a controller that implements different processes, when the operator detecting portion detects that the driver operates the operating portion and when the operator detecting portion detects that the front passenger operates the operating portion, wherein the signal receiving portion receives the signals from the signal outputting portion, when the driver or the front passenger touches the operating portion.

According to another aspect of the present invention, there is provided an in-vehicle display apparatus including: a display portion that respectively displays images on a first screen for a driver and on a second screen for a front passenger on a common display to be visible from a viewing angle of the driver and another viewing angle from the front passenger; an operating portion by which various functions are operated by use of the first screen for the driver and the second screen for the front passenger; a signal outputting portion that respectively output different signals between the driver and the front passenger; a signal receiving portion that receives the signals from the signal outputting portion; an operator detecting portion that detects which of the driver or the front passenger operates on the basis of the signals received by the signal receiving portion; and a controller that implements different processes, when the operator detecting portion detects that the driver operates the operating portion and when the operator detecting portion detects that the front passenger operates the operating portion, wherein the signals output from the signal outputting portion are received by the signal receiving portion through the driver or the front passenger.

BRIEF DESCRIPTION OF THE DRAWINGS

Preferred exemplary embodiments of the present invention will be described in detail with reference to the following drawings, wherein:

FIG. 1 is a view illustrating a basic configuration of a multi-view display apparatus in accordance with an embodiment of the present invention;

FIG. 18A and FIG. 18B are examples of oscillation signals output from transmitters.

DESCRIPTION OF THE PREFERRED EMBODIMENTS

A description will now be given, with reference to the accompanying drawings, of exemplary embodiments of the present invention.

FIG. 1 is a view illustrating a basic configuration of a multi-view display apparatus in accordance with an exemplary embodiment of the present invention. Referring now to FIG. 1, the multi-view display apparatus includes: a display controller 10; a display 100 (display portion); and the like. To the display controller 10, image data (image signal) DT1 is supplied from a first image source 300A, and at the same time, image data (image signal) DT2 is also supplied from a second image source 300B. Then, image data (image signal) ADT, which is composed of the first image data DT1 and the second image data DT2, is output to the common display 100. The configuration of the display controller 10 will be described later in detail. The first image source 300A and the second image source 300B are respectively composed of multiple sources such as a camera, TV receiver, DVD reproducing portion, HD reproducing portion, navigation portion, and the like, as will be described later.

The display 100 includes a liquid crystal panel, backlight, parallax barrier, and the like, as will also be described later. A first image IM1 based on the first image data DT1 and a second image IM2 based on the second image data DT2 are displayed on a common display so that an observer OBR can watch the first image IM1 from a right-hand direction and an observer OBL can watch the second image IM2 from a left-hand direction. The configuration of the display 100 will also be described later in detail.

Figure 2:
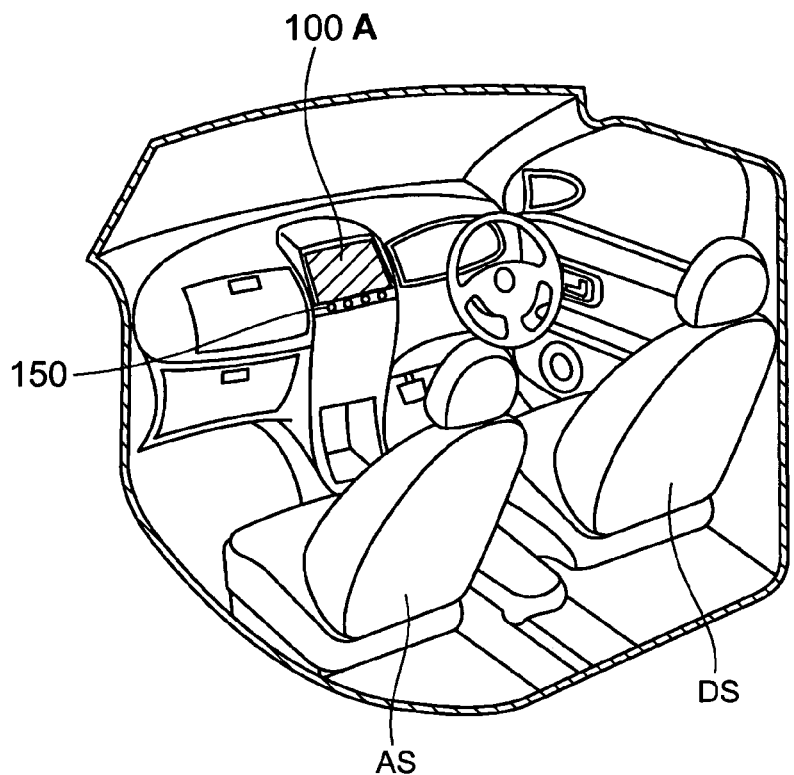
FIG. 2 is a perspective view of an in-vehicle display apparatus in accordance with an exemplary embodiment of the present invention.
Figure 3:
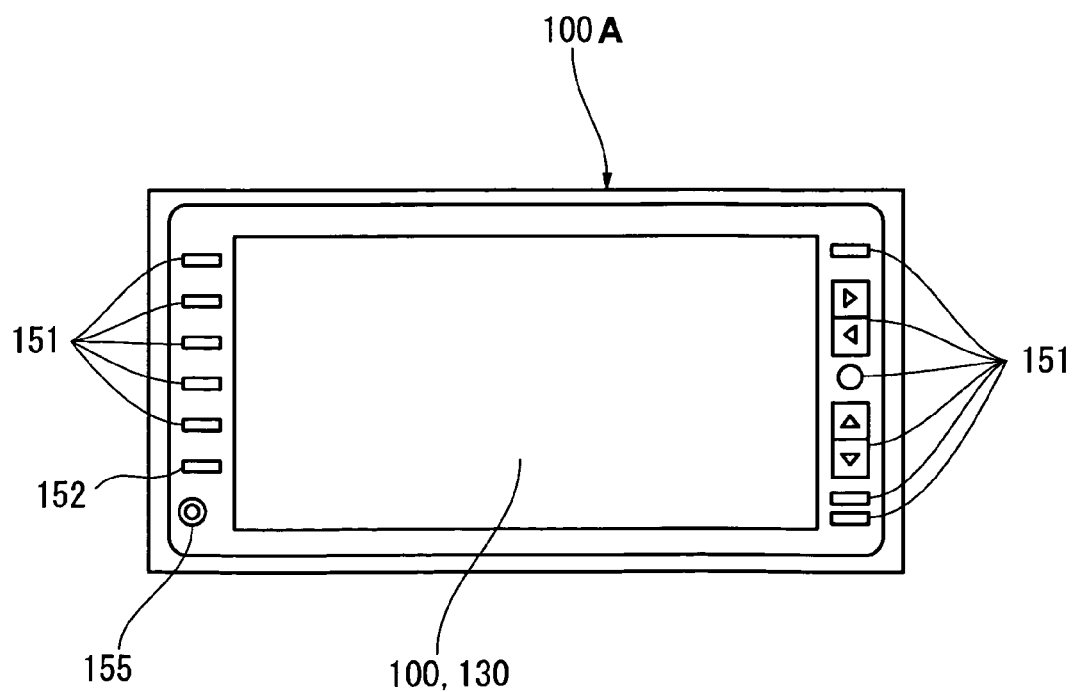
FIG. 3 is a front view of a display of the in-vehicle display apparatus in accordance with an exemplary embodiment of the present invention.

FIG. 2 is a perspective view of an in-vehicle display apparatus in accordance with an exemplary embodiment of the present invention. FIG. 3 is a front view of a display of the in-vehicle display apparatus in accordance with an exemplary embodiment of the present invention. Referring to FIG. 2, a main body 100A of the in-vehicle display apparatus is built in a dashboard area of the vehicle and is arranged between a driver's seat DS and a front passenger's seat AS. A passenger who sits on the driver's seat DS corresponds to the above-described observer OBR, and another passenger who sits on the front passenger's seat AS corresponds to the above-described observer OBL. Those passengers are able to simultaneously watch individual images, namely, the first image IM1 and the second image IM2, which are respectively different and displayed on the display 100, from the driver's seat DS and from the front passenger's seat AS.

Referring now to FIG. 3, the display 100 is provided with multiple operation buttons 151, a switch button 152, an external device connecting terminal 155, and the like at both sides of a liquid crystal panel 110 and a touch panel 130 (operating portion), described later. The multiple operation buttons 151 are provided for various operations of the display apparatus. The switch button 152 is provided for selectively changing a dual display mode and a single display mode. In the dual display mode, different images are respectively shown on the screen for the driver's seat DS and on that for the front passenger's seat AS. In the single display mode, an identical image is displayed. Here, the multiple operation buttons 151 and the switch button 152 compose an operating portion 150 (operating portion), described later. The external device connecting terminal 155 is provided for connecting an external device composed, for example, of a reproducing apparatus for music, images, or the like.

Figure 4:
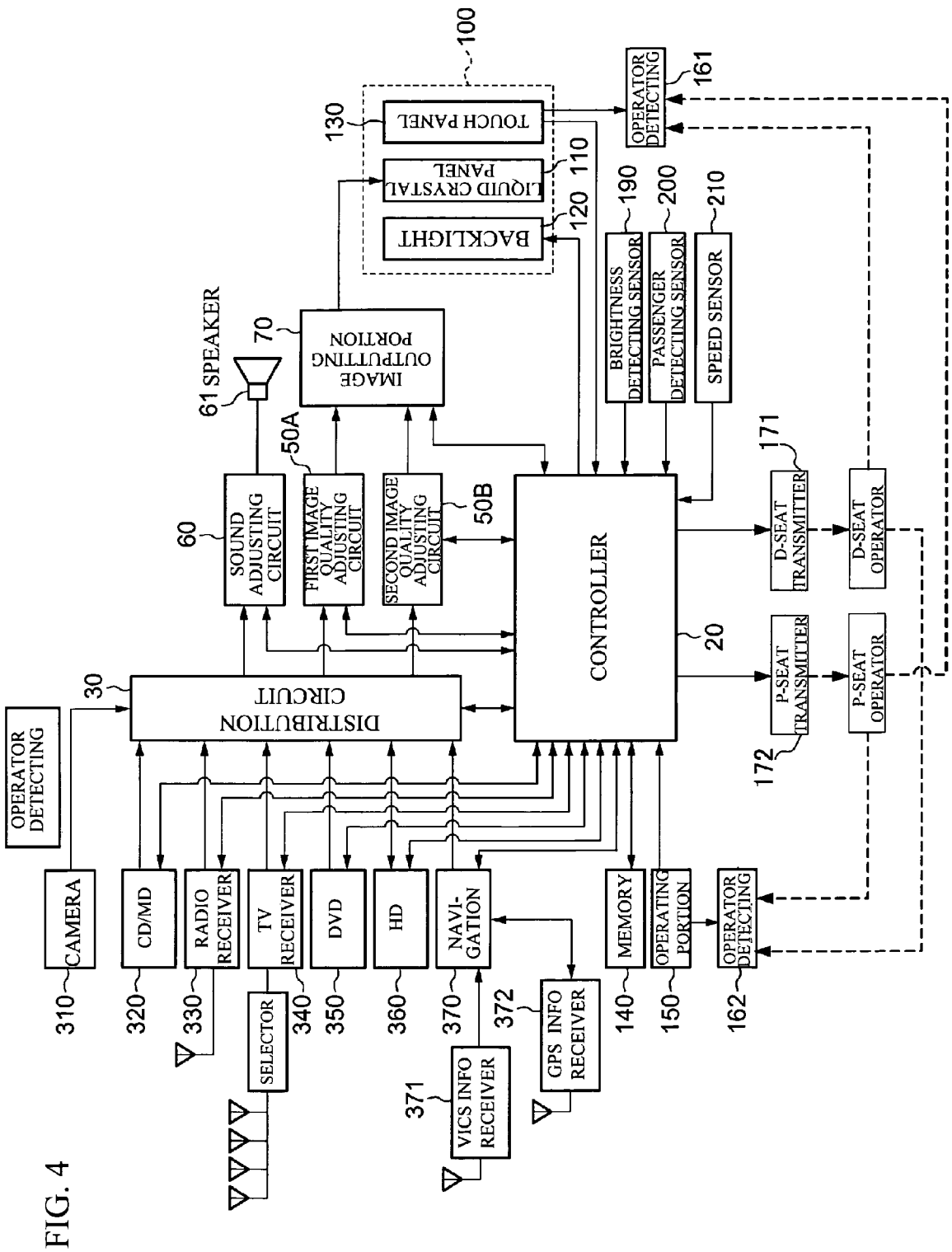
FIG. 4 is a functional block diagram of the display apparatus in accordance with an embodiment of the present invention.
Figure 5:
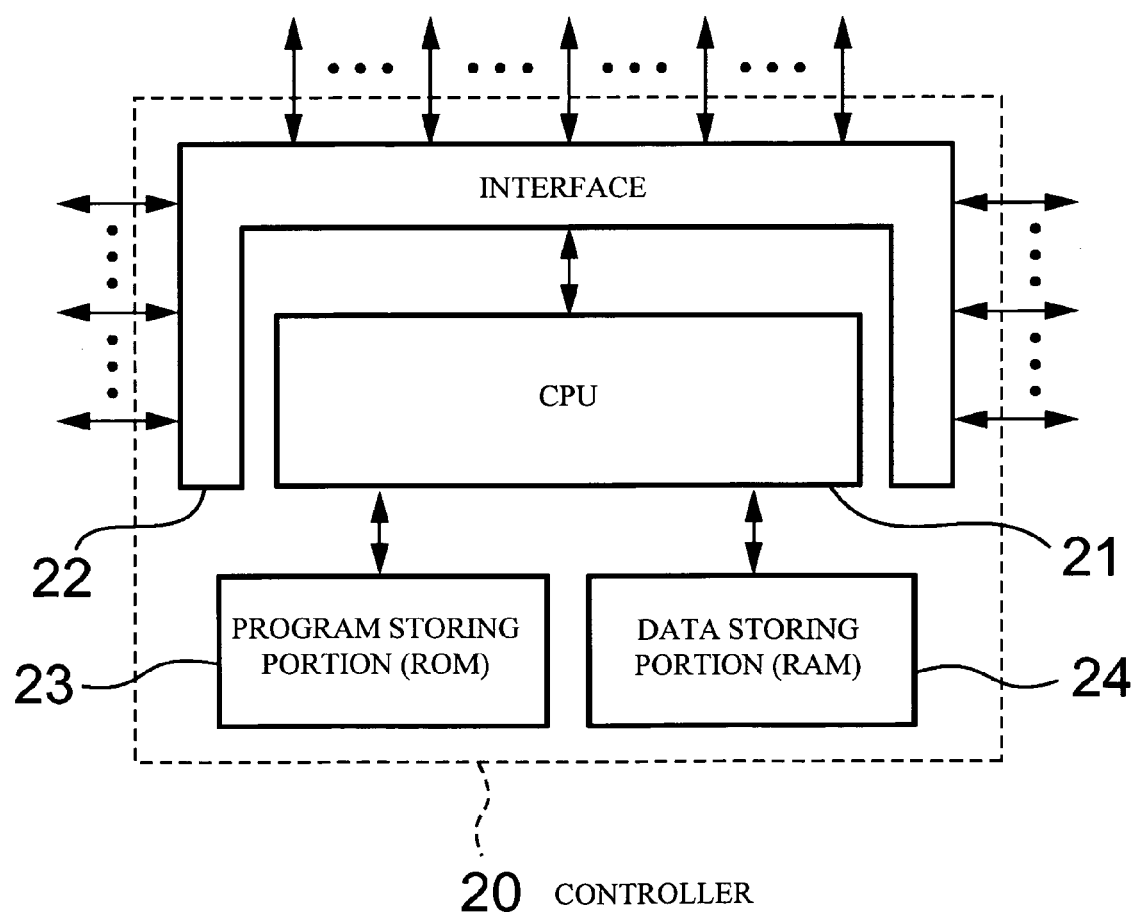
FIG. 5 is a functional block diagram showing a configuration of a controller in accordance with an embodiment of the present invention.
Figure 6:
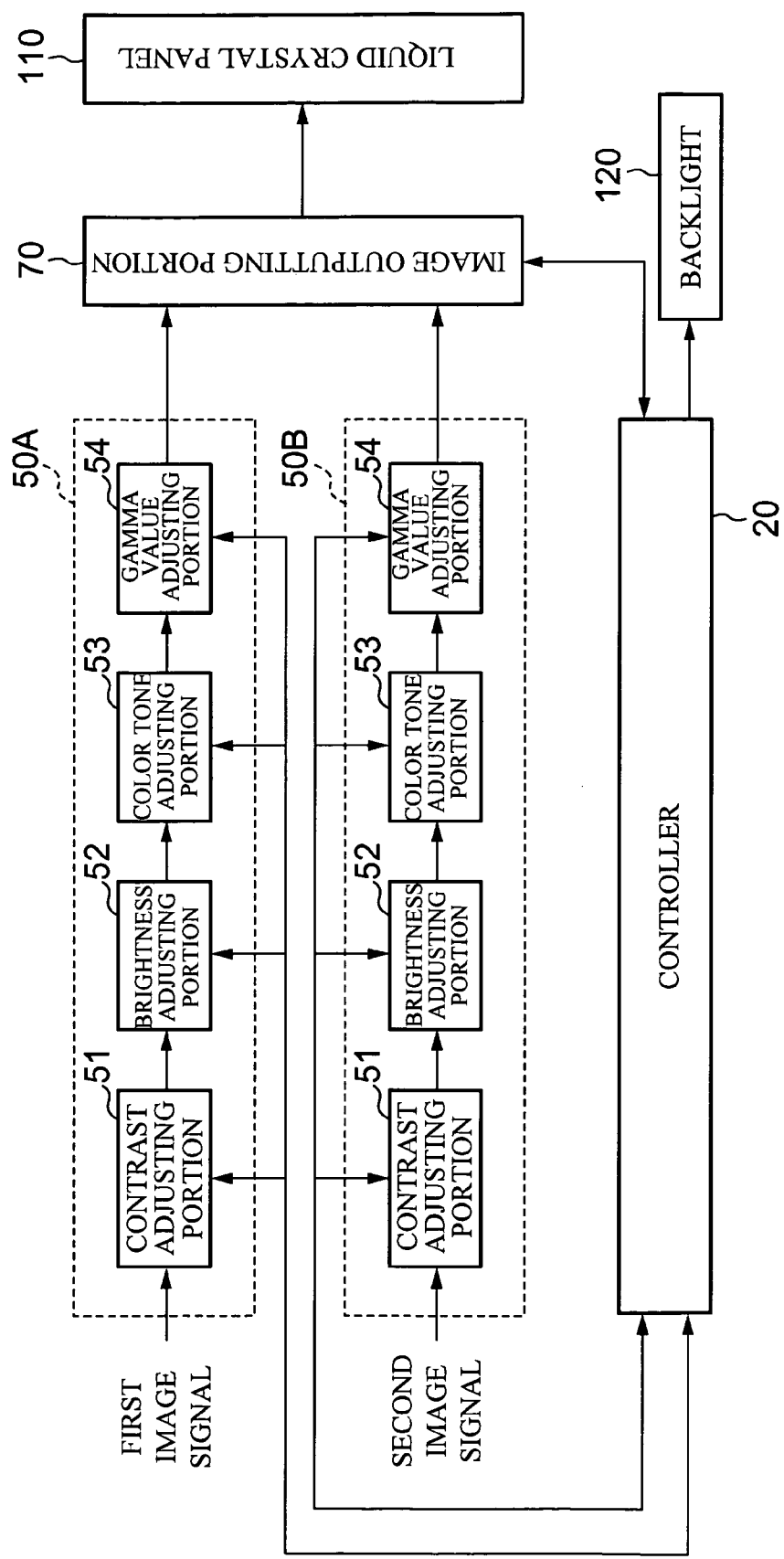
FIG. 6 is a functional block diagram of first and second image quality adjusting circuits in accordance with an embodiment of the present invention.
Figure 7:
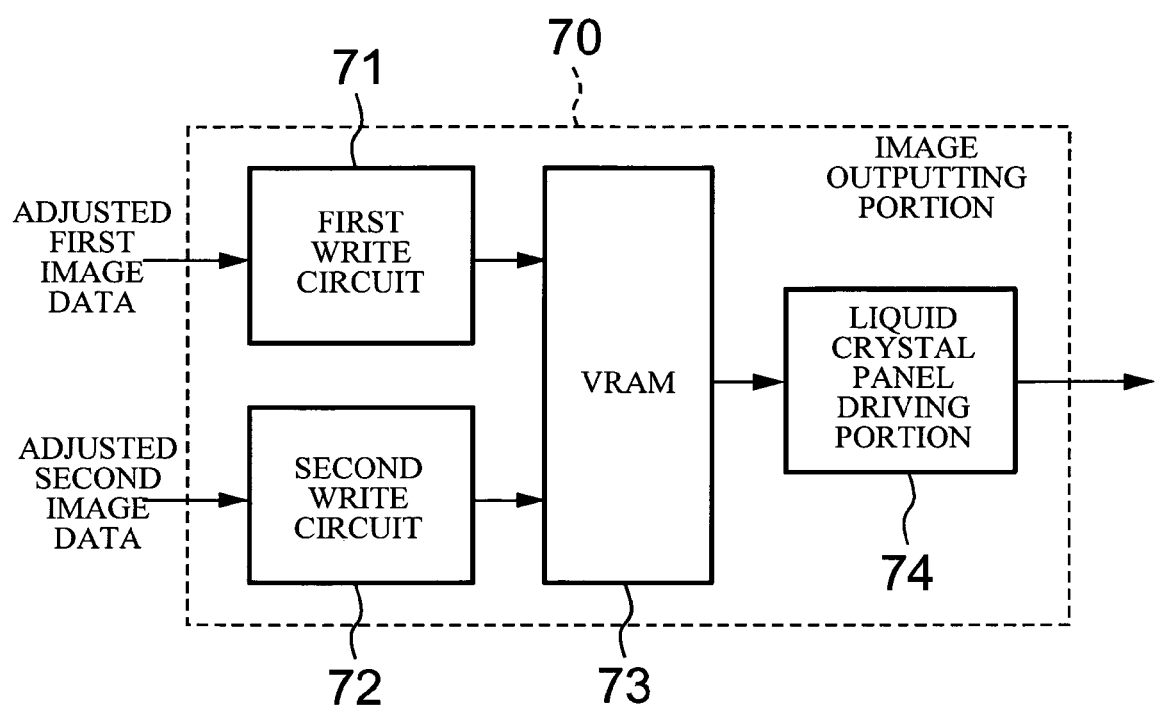
FIG. 7 is a functional block diagram of an image outputting portion in accordance with an embodiment of the present invention.
Figure 8:
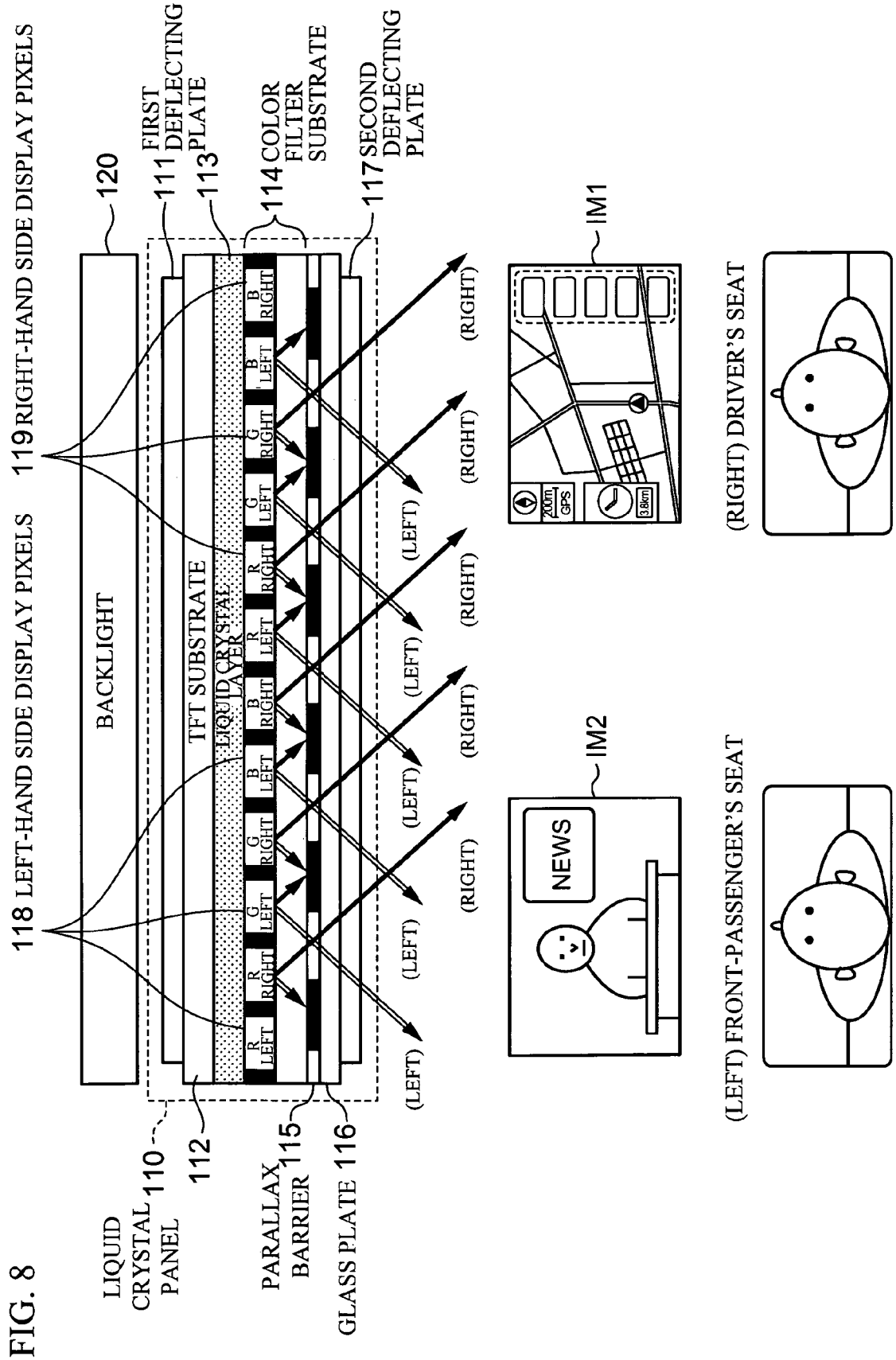
FIG. 8 is a view illustrating a cross-sectional configuration and effects of a liquid crystal panel in accordance with an embodiment of the present invention.
Figure 9:
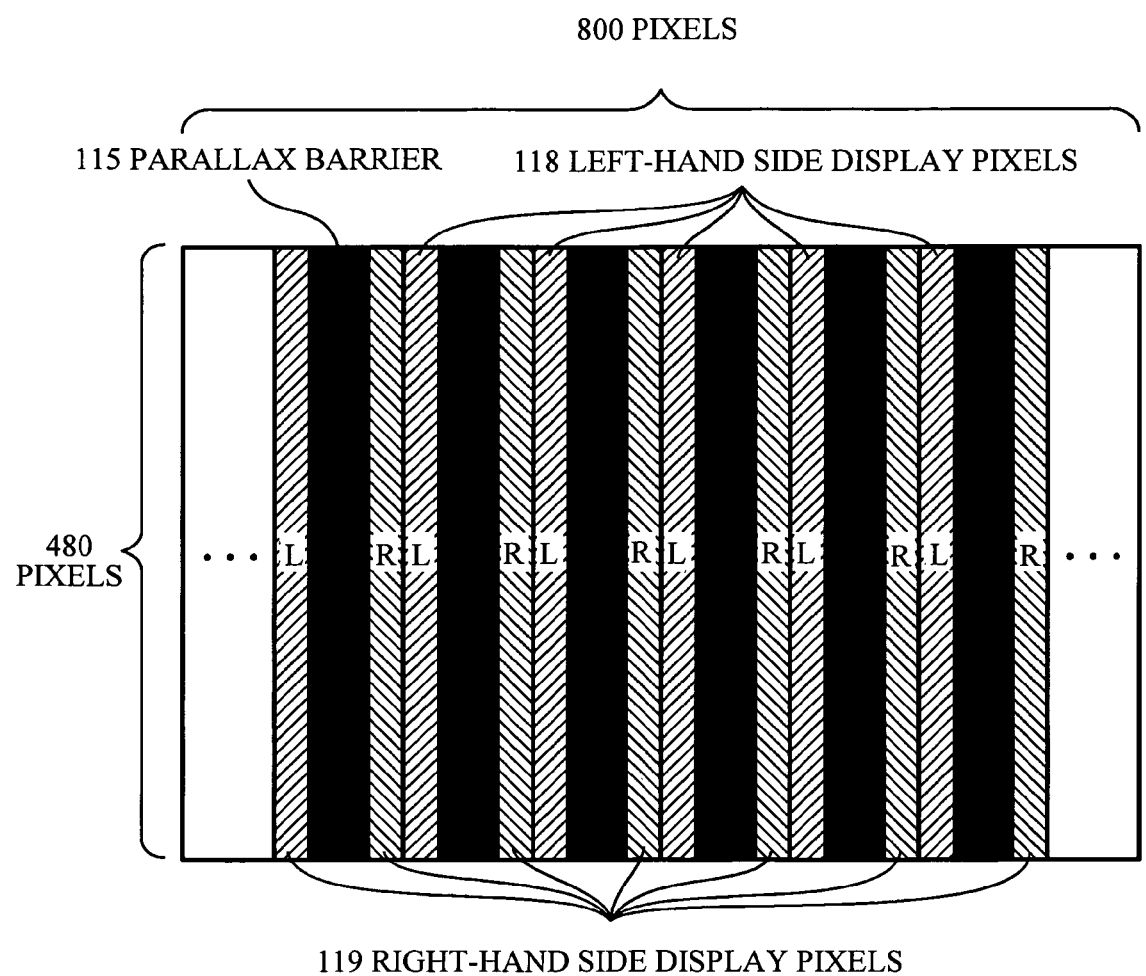
FIG. 9 is a front view of the liquid crystal panel in accordance with an embodiment of the present invention.
Figure 10:
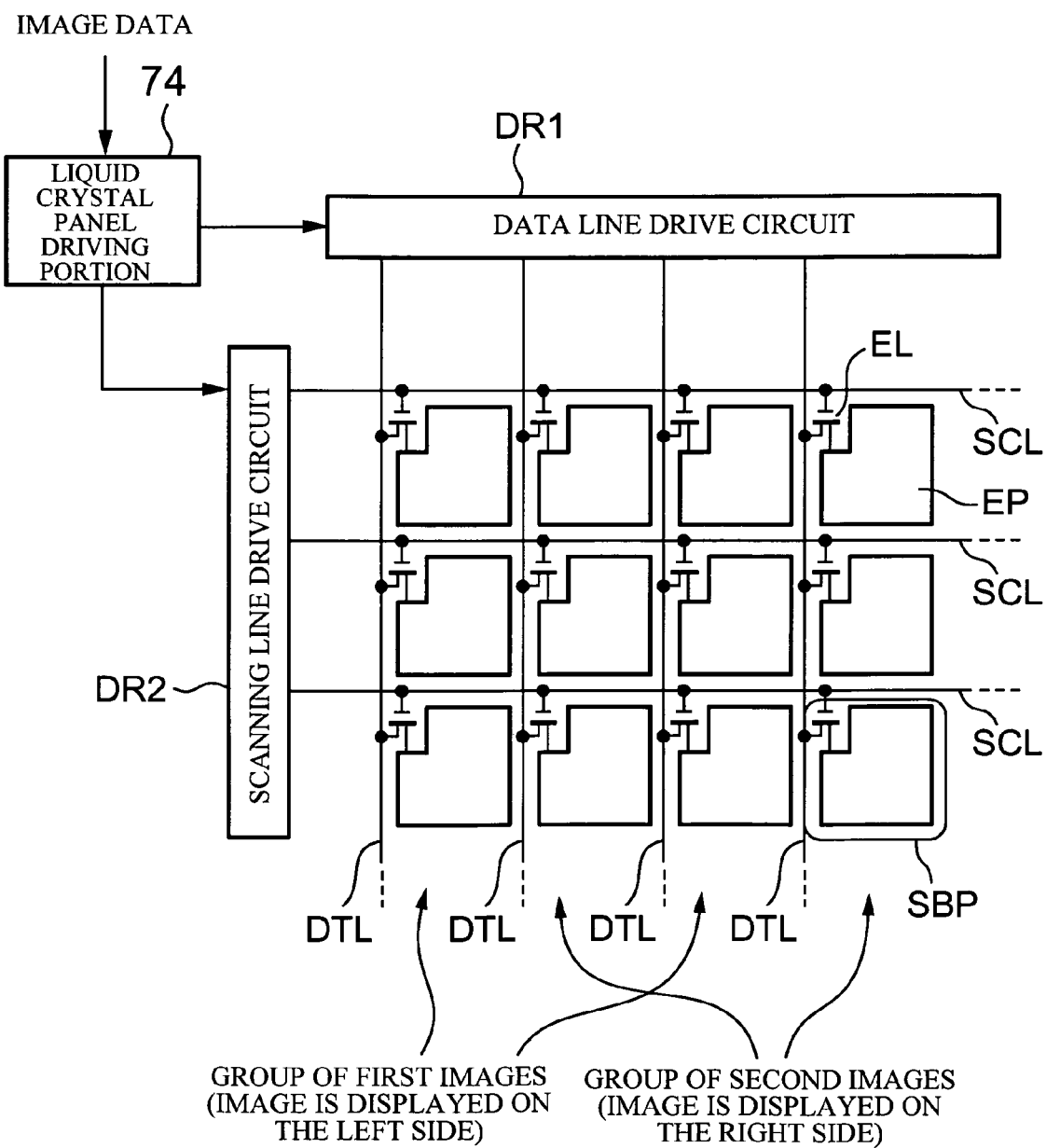
FIG. 10 is a circuit diagram of a TFT substrate in accordance with an embodiment of the present invention.

FIG. 4 through FIG. 10 illustrate specific configurations of the display apparatus in accordance with an exemplary embodiment of the present invention. FIG. 4 is a functional block diagram of the display apparatus. FIG. 5 is a functional block diagram showing a configuration of a controller. FIG. 6 is a functional block diagram of first and second image quality adjusting circuits. FIG. 7 is a functional block diagram of an image outputting portion. FIG. 8 is a view illustrating a cross-sectional configuration and effects of the liquid crystal panel. FIG. 9 is a front view of the liquid crystal panel. FIG. 10 is a circuit diagram of a TFT substrate.

Referring now to FIG. 4, the display apparatus includes the display 100, a controller 20, a distribution circuit 30, a first image quality adjusting circuit 50A, a second image quality adjusting circuit 50B, an image outputting portion 70, and the like. The display controller 10 includes the controller 20, the distribution circuit 30, the first image quality adjusting circuit 50A, the second image quality adjusting circuit 50B, the image outputting portion 70, and the like.

Referring now to FIG. 5, the controller 20 includes a processor (CPU) 21, an interface 22, a ROM 23, a RAM 24, and the like. The controller 20 controls the display apparatus according to a program stored in the ROM 23 in a comprehensive manner. Also, the controller 20 controls a visible range of the first image IM1 and a visible range of the second image IM2, which are separated from each other by superimposing the first image IM1 and the second image IM2 to be displayed on the display 100, to have a given range respectively, by adjusting the image quality of at least one of the first image IM1 and the second image IM2.

The controller 20 is connected to: a camera 310 that captures images of surroundings and the like of the vehicle; a compact disc/mini disc (CD/MD) reproducing portion 320 that reproduces music or images; a radio receiver 330 that receives radio waves via an antenna; a TV receiver 340 that receives TV waves via an antenna through a selector; a digital versatile disc (DVD) reproducing portion 350 that reproduces music information and images in a DVD; a hard disc (HD) reproducing portion 360 that reproduces images and music information stored in a HD; a navigation portion 370 that outputs maps or route guide images on the basis of road information received by a VICS information receiver 371 and geographic information received by a GPS information receiver 372; and the like, so as to send and receive data and control the afore-described components, which are mounted in a vehicle and respectively serve as supply sources supplying images and sound, as illustrated in FIG. 4.

The controller 20 is also connected to: an external memory 140 stores various kinds of data; the operating portion 150 provided for operating the display apparatus; a brightness detecting sensor 190 composed of a light switch or a light sensor to detect the brightness inside the vehicle; a passenger detecting sensor 200 composed of a pressure-sensitive sensor or the like on the driver's seat or the front passenger's seat to detect a passenger in the vehicle; and the like. The controller 20 enables various controls on the basis of various kinds of data obtained from the aforementioned components. In addition, the operation portion 150 is provided with an operator detecting portion 162, described later.

The distribution circuit 30, as illustrated in FIG. 4, distributes sound data and image data supplied from the above-described camera 310, the CD/MD reproducing portion 320, the radio receiver 330, the TV receiver 340, the DVD reproducing portion 350, the HD reproducing portion 360, the navigation portion 370, and the like, to the first image quality adjusting circuit 50A or the second image quality adjusting circuit 50B, according to a control instruction issued by the controller 20.

A sound adjusting circuit 60 adjusts the sound data supplied from the distribution circuit 30 to output to a speaker 61, as illustrated in FIG. 4.

Each of the first image quality adjusting circuit 50A and the second image quality adjusting circuit 50B, by reference to FIG. 6, includes: a contrast adjusting portion 51; a brightness adjusting portion 52; a color tone adjusting portion 53; a gamma value adjusting portion 54; and the like, and respectively adjusts the image qualities (contrast, brightness, color tone, and gamma value) of the first image data and those of the second image data, in response to the control instruction issued by the controller 20.

Referring now to FIG. 7, the image outputting portion 70 includes: a first write circuit 71; a second write circuit 72; a video RAM (VRAM) 73; a liquid crystal panel driving portion 74; and the like. The first image data and the second image data, image qualities of which have respectively been adjusted by the first image quality adjusting circuit 50A and the second image quality adjusting circuit 50B, are respectively written into the first write circuit 71 and the second write circuit 72. The first write circuit 71 and the second write circuit 72 respectively write the first image data and the second image data into given addresses of the VRAM 73, in order to superimpose such adjusted first image data and second image data.

The VRAM 73 retains the image data on which the first image data and the second image data are superimposed. Such superimposed image data corresponds to respective pixels of the display 100. The liquid crystal panel driving portion 74 is a circuit that drives the liquid crystal panel 110, described later, and also drives the corresponding pixels of the liquid crystal panel 110, on the basis of the superimposed image data retained in the VRAM 73.

The display 100 includes: the liquid crystal panel 110; a backlight 120 that sheds illuminated lights from the backside of the liquid crystal panel 110; the touch panel 130 provided for inputting a signal to operate the display apparatus; and the like, as illustrated in FIG. 4. Here, the touch panel 130 is not shown, yet is formed in a shape of transparent sheet and adhered to the front surface of the liquid crystal panel 110. The touch panel 130 is provided with an operator detecting portion 161, described later.

Referring now to FIG. 8, the liquid crystal panel 110 has a known structure. Sequentially from the backlight 120, there are provided: a first deflecting plate 111; a thin film transistor (TFT) substrate 112; a liquid crystal layer 113; a color filter substrate 114 having pixels for three primary colors of RGB; a parallax barrier 115; a glass plate 116; a second deflecting plate 117; and the like.

The above-described liquid crystal panel 110 has a display screen in which, for example, 800 pixels are arranged in a horizontal direction and 480 pixels in a vertical direction, as illustrated in FIG. 8 and FIG. 9. Also, left-hand side display pixels 118 (hereinafter, also referred to as front passenger's display pixel 118) and right-hand side display pixels 119 (hereinafter, also referred to as driver's display pixel 119) are alternately arranged in a horizontal direction of the display screen.

The parallax barrier 115 is formed in a stripe-shaped manner, and includes shielding portions and transmitting portions, as illustrated in FIG. 8 and FIG. 9. The shielding portions are arranged between the left-hand side display pixels 118 and the right-hand side display pixels 119. By providing the parallax barrier 115 on the front surface of the color filter substrate 114, among the illuminated lights that have passed through the left-hand side display pixels 118, only the lights going towards the left side selectively pass through the transmitting portions of the parallax barrier 115. Among the illuminated lights that have passed through the right-hand side display pixels 119, only the lights going towards the right side selectively pass through the transmitting portions of the parallax barrier 115. This makes the first image IM1 visible from the right side (the driver's seat) of the liquid crystal panel 110, and also makes the second image IM2 visible from the left side (the front passenger's side), as illustrated in FIG. 8. Here, a similar parallax barrier as disclosed in Japanese Patent Application Publication No. 10-123461 or Japanese Patent Application Publication No. 11-84131 may be employed for the parallax barrier 115.

Referring now to FIG. 10, the TFT substrate 112 includes: a data line drive circuit DR1; a scanning line drive circuit DR2; vertically arranged scanning lines SCL; horizontally arranged data lines DTL; TFT elements EL, pixel electrodes EP respectively corresponding to the TFT elements EL, and the like, whereas each of the TFT elements EL is formed in each region where each of the scanning lines SCL and each of the data lines DTL are crossed. Sub pixels SBP are formed by regions surrounded by the scanning lines SCL and the data lines DTL, and the sub pixels SBP arranged along each of the data lines DTL are alternately assigned to the left-hand side display pixels 118 and to the right-hand side display pixels 119. A drive timing of the data line drive circuit DR1 is controlled by the liquid crystal panel driving portion 74 to control a voltage applied to the pixel electrode EP. A Drive timing of the scanning line drive circuit DR2 is controlled by the liquid crystal panel driving portion 74 to selectively scan the TFT element EL.

Figures 11A, 11B:
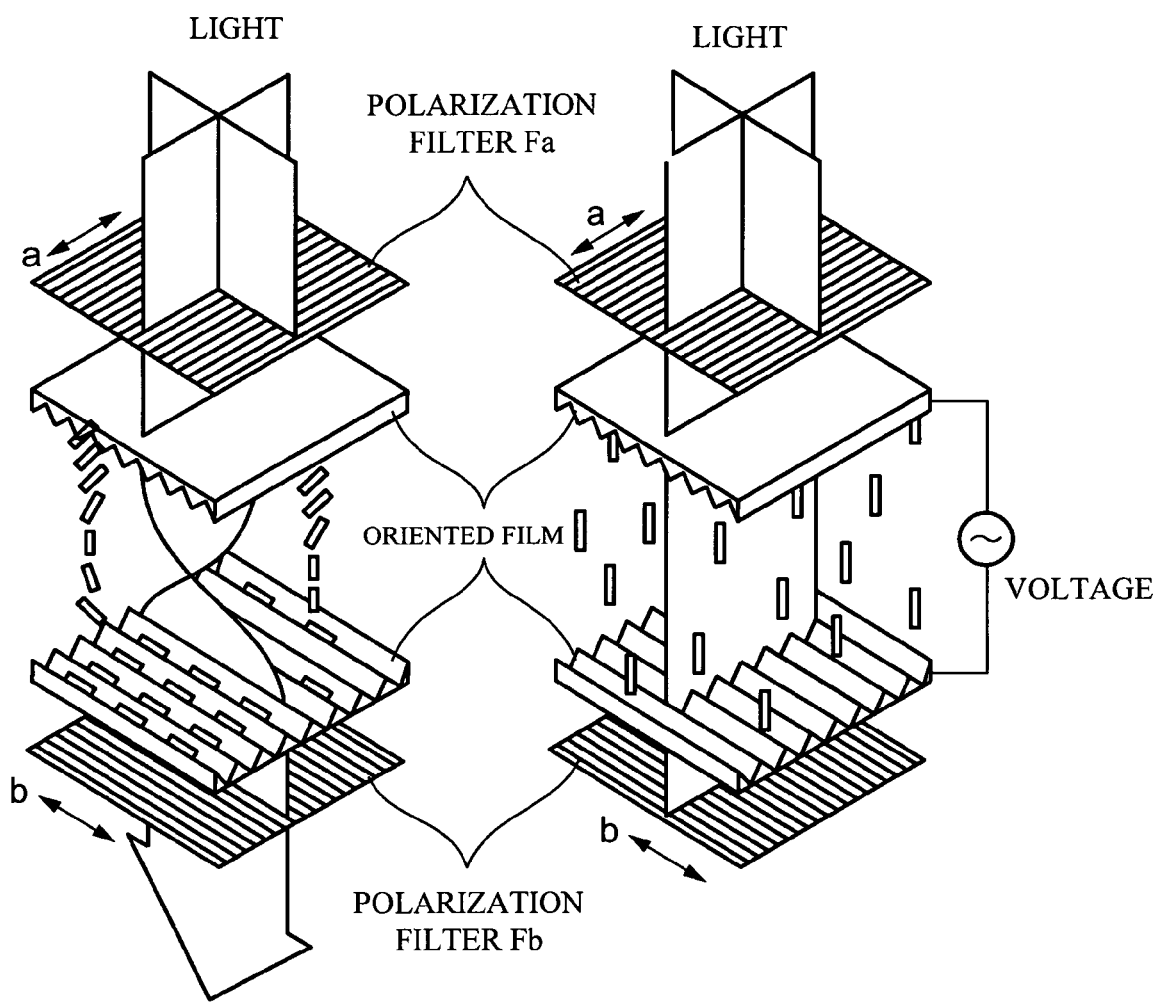
FIG. 11A and FIG. 11B illustrate drive principle of a crystal liquid.
Figure 12:
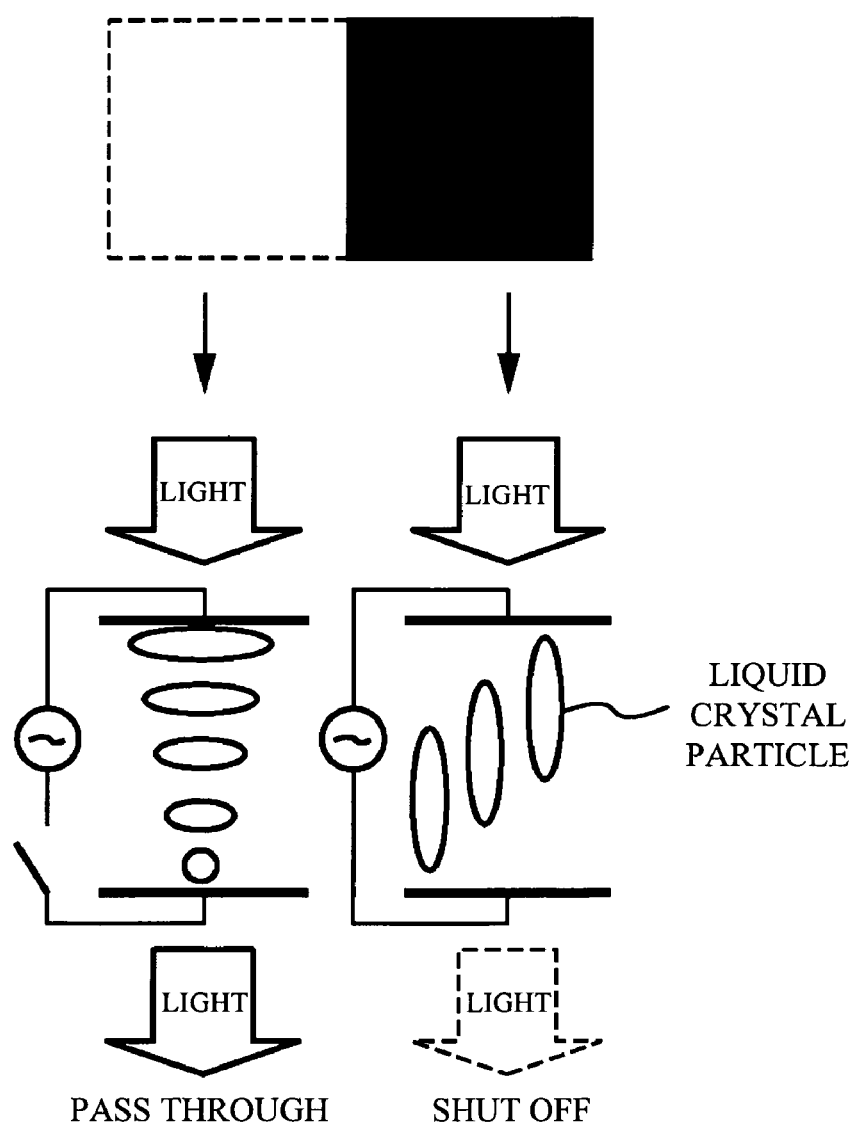
FIG. 12 illustrates a function of the crystal liquid as a shutter.

Referring now to FIG. 11A, FIG. 11B, and FIG. 12, a description will be given of the drive principle of a Twisted Nematic (TN) liquid crystal, as an example of liquid crystal employed as an aspect of the present invention. As shown in FIG. 11A, a twisted liquid crystal is sandwiched between two polarization filters Fa and Fb (deflecting plates) with the polarization directions oriented at right angles with respect to each other to prevent the light from passing through. When the light enters from the top, the light rotates at 90 degrees along gaps of liquid crystal particles and passes through the lower polarization filter Fb. As shown in FIG. 11B, when a voltage is applied to the liquid crystal, the liquid crystal particles rise and no longer rotate. Accordingly, the light entering from the top just moves downward, but cannot pass through the lower polarization filter Fb. That is to say, as shown in FIG. 12, the light passes through when there is no voltage applied to the liquid crystal particles. The light, however, is shut off and the appearance on the display screen is black when a voltage is applied. Voltage serves as a shutter of light. This enables brightness control by means of the control of the voltage applied to the liquid crystal. In addition, the brightness control of the image for the left side and that for the right side is enabled, by respectively controlling the voltages applied to the corresponding liquid crystal for the first image IM1 and that for the second image IM2.

The memory 140 may be composed, for example, of a non-volatile memory that is electrically rewritable such as a flash memory or the like, or may be composed of a volatile memory with battery backup to store data necessary for control by the controller 20. Vehicle information such as a handle position of the vehicle is stored.

A description will now be given of operator detecting portions 161 and 162. The operator detecting portions 161 and 162 compose a signal receiving portion. The operator detecting portion 161 detects the person who operates the touch panel 130, namely, which of the operator on the driver's seat DS (hereinafter, simply referred to as D-seat operator) or the operator on the front passenger's seat AS (hereinafter, simply referred to as P-seat operator) operates the touch panel 130. Then, the operator detecting portions 161 may output a detection signal to the controller 20. The operator detecting portions 162 detects the person who operates the operating portion 150 composed of the operation buttons 151 and the switch button 152, namely, which of the D-seat operator or the P-seat operator operates the operating portion 150. Then, the operator detecting portion 162 may output the detection signal to the controller 20. In other words, the operator detecting portions 161 and 162 detect the signals respectively generated from the driver's seat DS and from the front passenger's seat AS by means of sensors, so as to detect which operator operates, the D-seat operator or the P-seat operator operates.

The detection of the operator who operates the touch panel 130 or the operating portion 150 may be enabled by, for example, applying electronic pulse signals or vibrations of different frequencies to the D-seat operator and the P-seat operator. When each of the operators touches the touch panel 130 or the operating portion 150, the frequency of the electronic signal or vibration can be identified by the controller 20. However, the present invention is not limited to the aforementioned detection method. Alternative detection method may be employed, as disclosed in Japanese Patent Application Publication No. 11-248466.

Here, a description will now be given of an example of an operator determination method, by use of signals detected by the operator detecting portion 161 or the operator detecting portion 162, according to an aspect of the present invention. The controller 20 determines whether the P-seat operator or the D-seat operator operates the touch panel 130 or the operating portion 150. As shown in FIG. 4, there is provided a signal outputting portion, composed of a transmitter 171 for the D-seat operator (hereinafter, simply referred to as D-seat transmitter) and a transmitter 172 for the P-seat operator (hereinafter, simply referred to as P-seat transmitter). The controller 20 supplies different types of control signals to the D-seat transmitter 171 and the P-seat transmitter 172. The D-seat transmitter 171 and the P-seat transmitter 172 are configured to output oscillation signals on the basis of the control signals supplied from the controller 20. The oscillation signals may be configured, for example, as shown in FIG. 18A, such that the D-seat transmitter 171 and the P-seat transmitter 172 respectively output the oscillation signals at different frequencies. In an example of FIG. 18A, the oscillation signals at 100 Hz are output from the D-seat transmitter 171 and those at 150 Hz are output from the P-seat transmitter 172. Alternatively, as shown in FIG. 18B, the oscillation signals at the same frequency may be output from the D-seat transmitter 171 and the P-seat transmitter 172 with different output timings (time difference). In addition, the oscillation signals at different frequencies may be respectively output from the D-seat transmitter 171 and the P-seat transmitter 172 with different output timings. After the operator detecting portion 161 or the operator detecting portion 162 determines which the oscillation signals detected at the touch panel 130 or at the operating portion 150 are output from the D-seat transmitter 171 or the P-seat transmitter 172, the controller 20 determines whether the D-seat operator or the P-seat operator operates the touch panel 130 or the operating portion 150.

More specifically, for example, the touch panel 130 may utilize electrostatic capacitance technology such that the electrostatic capacitance varies in proportion to distances to a touched position from four corners of the sensor. The oscillation signal output from the transmitter is stored in a human body as an electric charge, since the human body serves as a capacitor (also known as human body communication technology). When the operator touches the touch panel 130, the electric charge at the touched position changes, according to the control signals supplied from the controller 20. Thus, the controller 20 determines whether the signal is output from the D-seat transmitter 171 or the P-seat transmitter 172, on the basis of the electrostatic capacitance detected at the touch panel 130, so as to determine which of the D-seat operator or the P-seat operator operates the touch panel 130. Subsequently, according to the afore-described determination result and the touched position of the operator's finger, the display apparatus operates in response to the touched position on the display screen.

Figure 13:
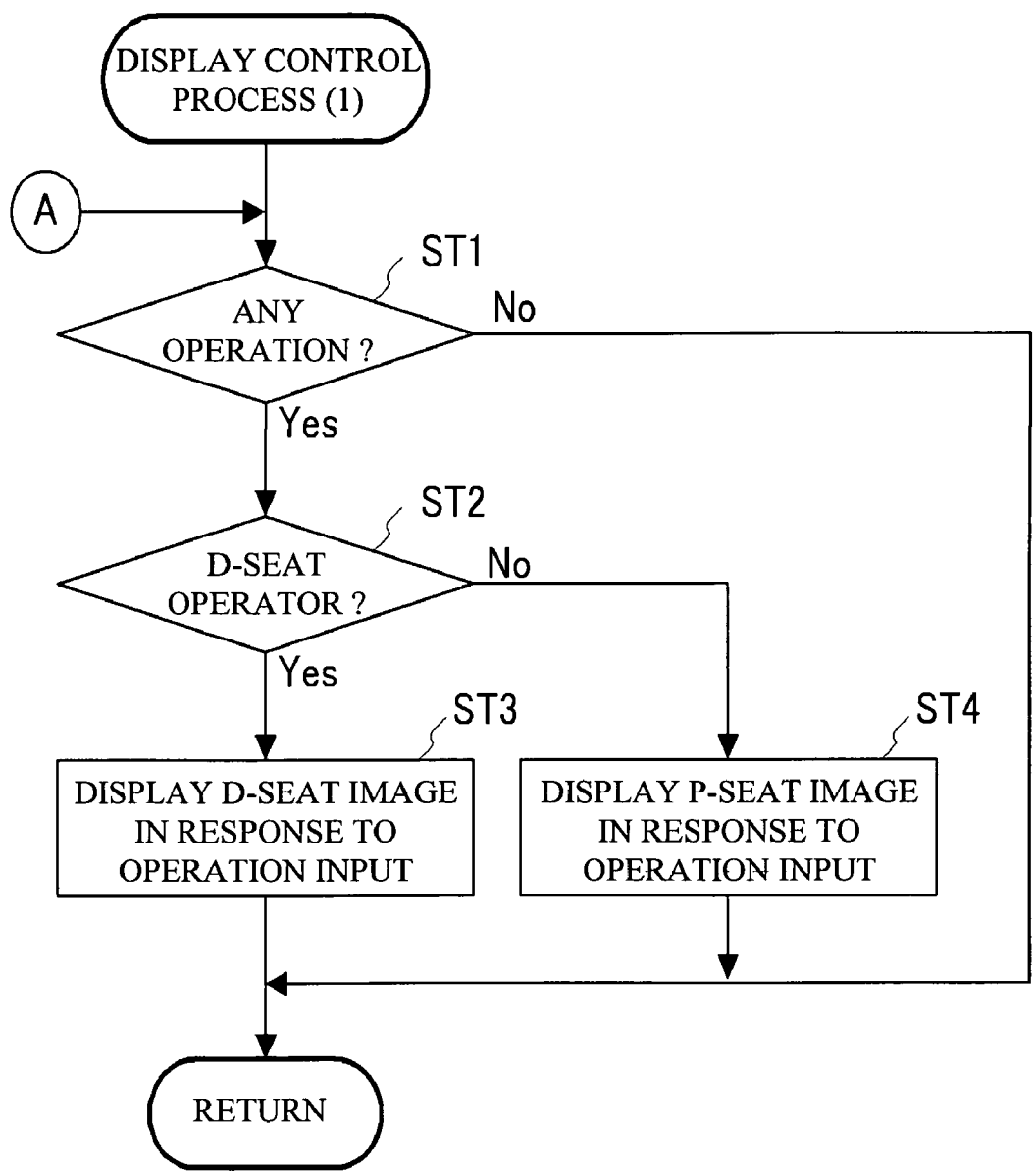
FIG. 13 is a flowchart showing an example of a display control process implemented by the controller.

Referring now to FIG. 13 and FIG. 14A through FIG. 14D, a description will now be given of an example of a display control process by the controller 20 by use of the operator detecting portions 161 and 162. FIG. 13 is a flowchart showing an example of the display control process (1) implemented by the controller 20. FIG. 14A through FIG. 14D are views illustrating examples of images displayed on the screen for driver's seat and those displayed on the screen for the front-passenger's seat. The controller 20 determines the image on the driver's seat DS (hereinafter, simply referred to as D-seat image) and the image on the front-passenger's seat AS (hereinafter, simply referred to as P-seat image), according to an input operation from the operating portion 150 and from the touch panel 130. This enables the image to be displayed according to the input operation. A description will be given below in more detail. The procedure shown in FIG. 13 is repeatedly implemented at given time intervals.

The controller 20 determines whether the operation is performed on the in-vehicle display apparatus on the basis of the signal applied from the operation buttons 151 or the touch panel 130 (step ST1). If the operation is not performed, the processing is terminated. If the operation buttons 151 or the touch panel 130 is operated, the controller 20 determines (detects) whether the operator is the D-seat operator or the P-seat operator. This determination (detection) is made based on the detection signals output from the operator detecting portions 161 and 162.

Figure 14A:
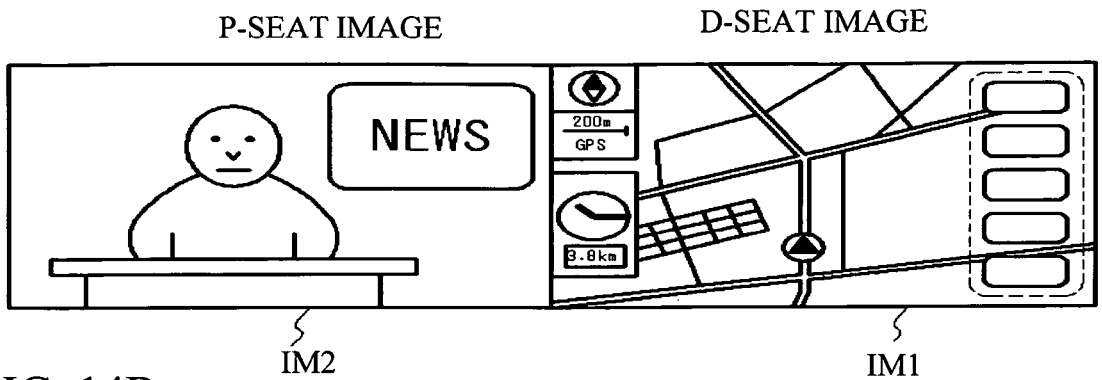
FIG. 14A through FIG. 14D illustrate examples of images shown on a screen for a driver's seat and that for a front-passenger's seat.
Figure 14B:
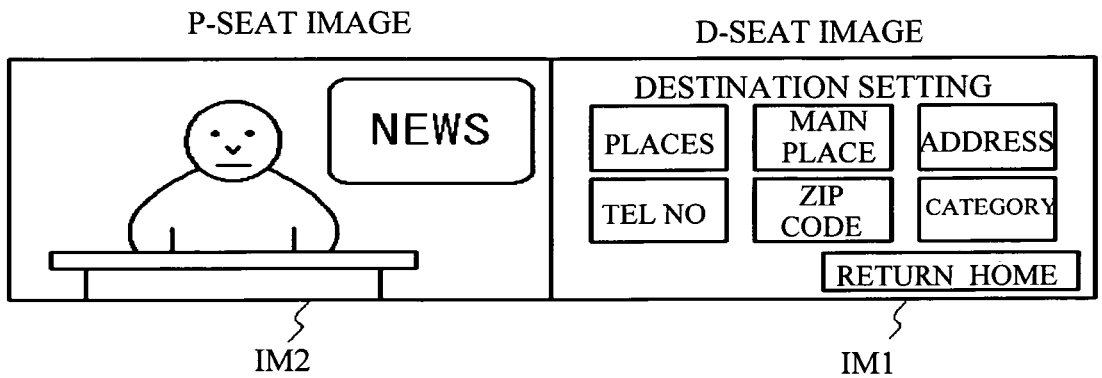
Figure 14C:
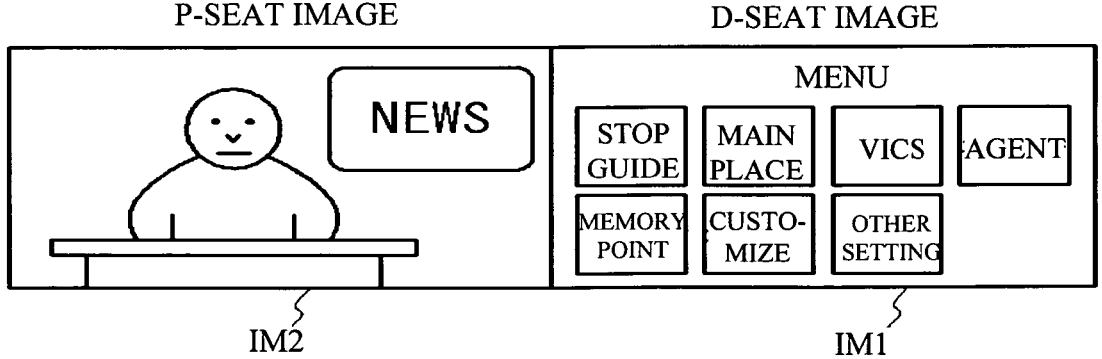
Figure 14D:
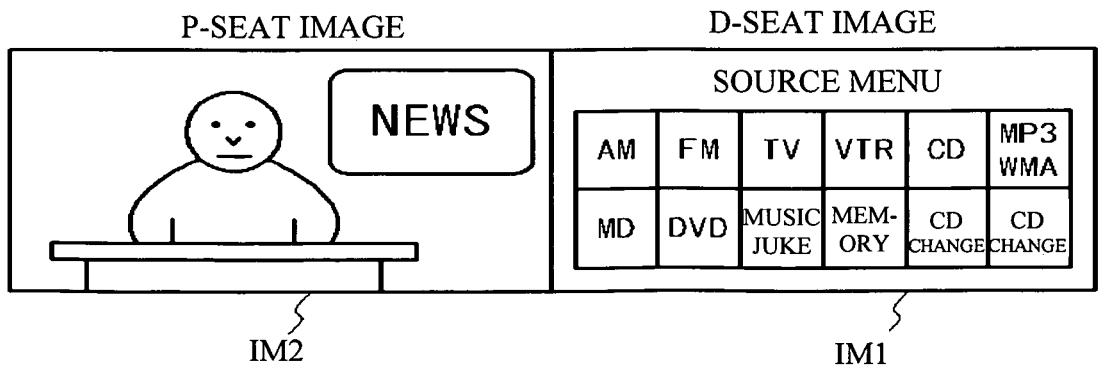

If the operation is made by the D-seat operator, the D-seat image is displayed in response to the content of the operation (step ST3). If the operation is made by the P-seat operator, the P-seat image is displayed in response to the content of the operation (step ST4). As shown in FIG. 14A, for example, a television picture is selectively displayed as a P-seat image IM2 and a navigation image is selectively displayed as a D-seat image IM1. When the D-seat operator operates the various operation buttons formed in the D-seat image IM1, an image for setting the destination shown in FIG. 14B, a navigation menu shown in FIG. 14C, or an image for an audio menu shown in FIG. 14D may be displayed as a D-seat image IM1. At this time, for example, even if the P-seat operator touches the various operation buttons formed in the D-seat image IM1, the image on the D-seat screen does not change. Meanwhile, even if the D-seat operator touches the various operation buttons 151 to operate the P-seat image IM2, the controller 20 does not accept the operation made by the D-seat operator because the operator is not the P-seat operator.

Figure 15:
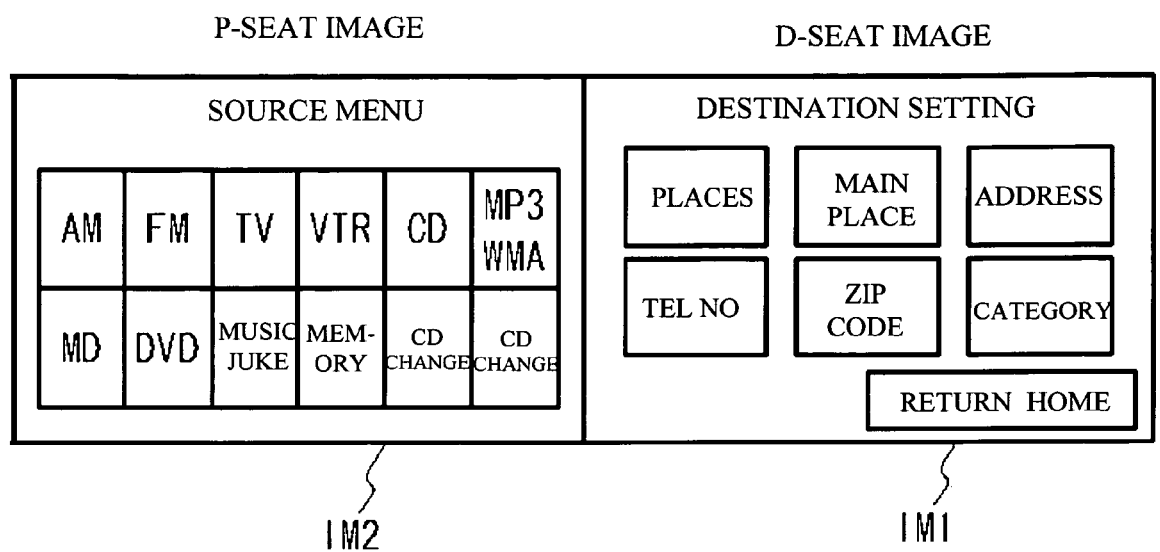
FIG. 15 illustrates alternative examples of the images shown on the screen for the driver's seat and that for the front-passenger's seat.

As described above, the D-seat image IM1 and the P-seat image IM2 can be operated independently, by detecting the operator of the various operation buttons 151 or the touch panel 130. For example, as shown in FIG. 15, the operation screen for setting the destination is displayed on the navigation image as a D-seat image IM1, and the image for audio selection operation is displayed as a P-seat image IM2. The operation buttons on the D-seat image IM1 and those on the P-seat image IM2 displayed as operating portions are formed in regions of overlap. In such a case, even if the P-seat operator touches the operation button of the D-seat image IM1, the D-seat image IM1 does not change. Even if the D-seat operator touches the operation button of the P-seat image IM2, the P-seat image IM2 does not change. That is to say, it is possible for common operating portions to have different functions. This is not limited to the touch panel 130, and the various operation buttons 151 composing the operating portion 150 may have different functions.

Figure 16:
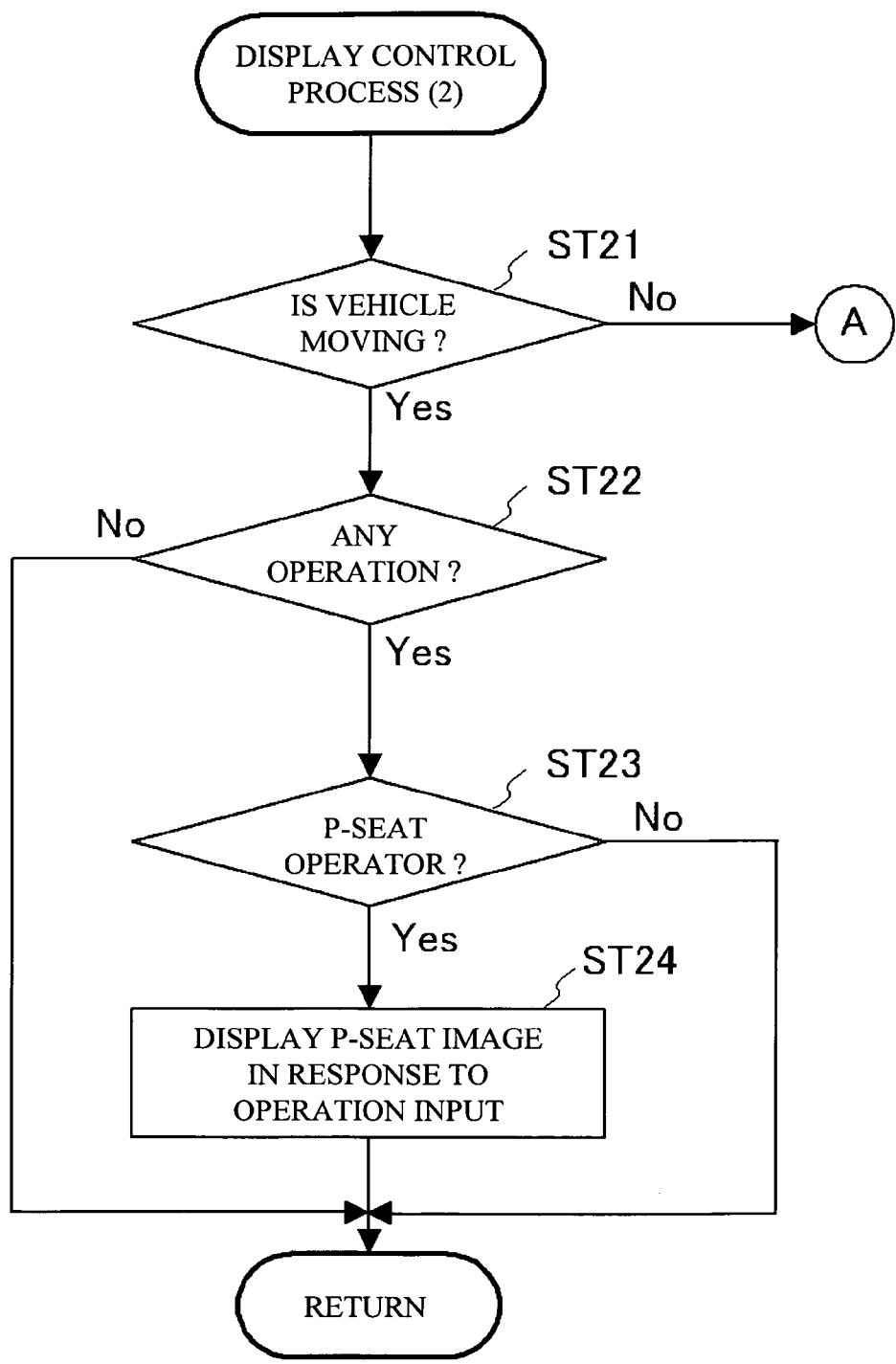
FIG. 16 is a flowchart showing an example of the display control process implemented by the controller while the vehicle is moving.
Figure 17A:
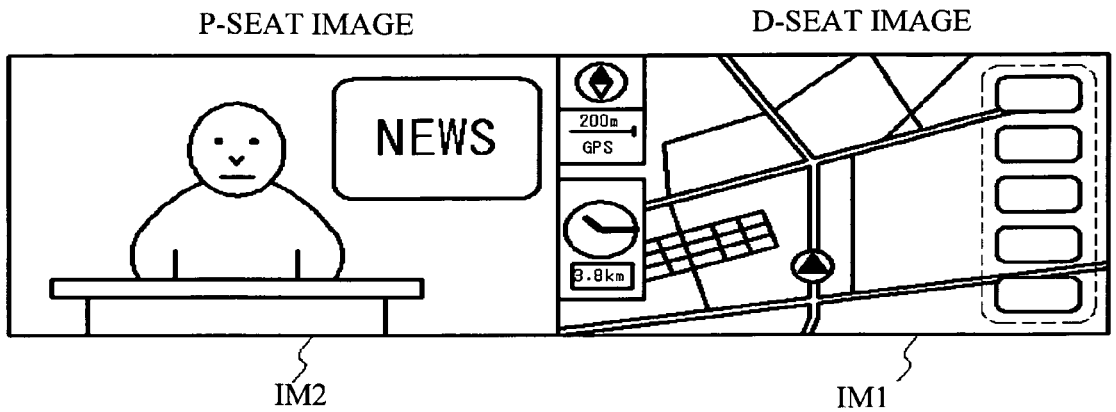
FIG. 17A through FIG. 17C illustrate examples of the images shown on the screen for the driver's seat and that for the front-passenger's seat, while the vehicle is moving.
Figure 17B:
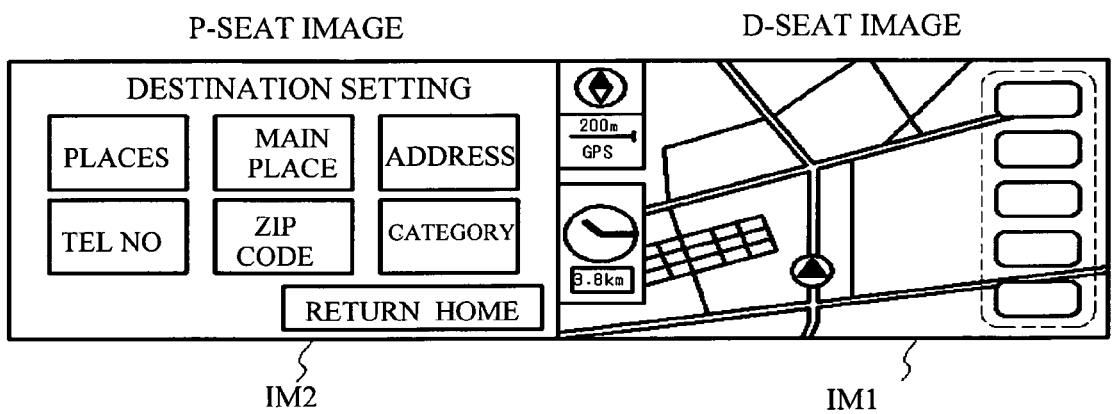
Figure 17C:
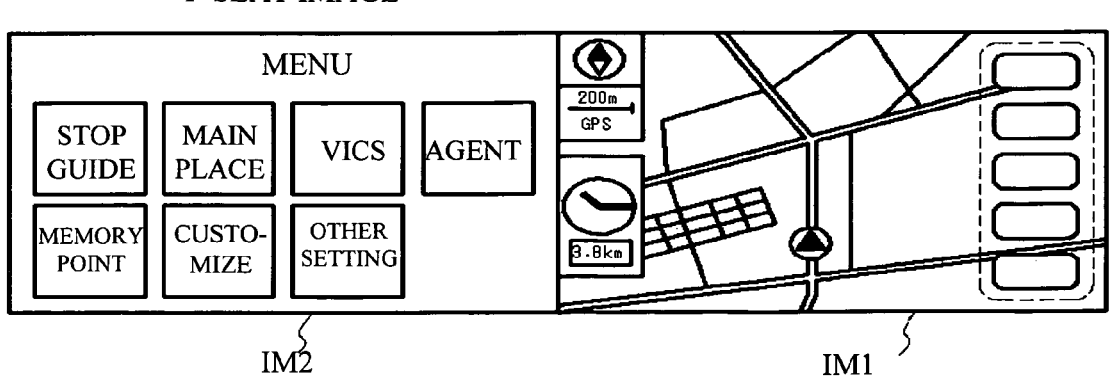

A description will now be given, with reference to FIG. 16 and FIG. 17A through FIG. 17C, of an example of another display control process implemented by the controller 20, while the vehicle is moving. FIG. 16 is a flowchart showing an example of the display control process (2) implemented by the controller 20. FIG. 17A through FIG. 17C are views illustrating examples of images displayed on the screen for the driver's seat and those displayed on the screen for the front-passenger's seat. The procedure shown in FIG. 16 is repeatedly implemented at given time intervals. In the examples shown in FIG. 16 and FIG. 17A through FIG. 17C, the process will be described under the restrictions while driving. The restrictions while driving generally denote that some operations are restricted while the vehicle is moving, since it is not desirable in consideration of safety to carry out an operation for destination search or destination setting on the navigation image being displayed on the screen for the driver's seat. Under the restrictions while driving, other images such as audio and the like are also restricted.

The controller 20 determines whether the vehicle is moving on the basis of the signal from a speed sensor 210, as shown in FIG. 16 (step ST21). If the vehicle is not moving, the process shown in FIG. 13 is implemented.

The controller 20 determines whether the operating portion 150 or the touch panel 130 is operated (step ST22). If the operating portion 150 or the touch panel 130 is operated, the controller 20 determines whether the operator is the D-seat operator or the P-seat operator (step ST23).

If the operation is made by the D-seat operator, the operation is not accepted and processing is terminated. If the operation is made by the P-seat operator, the P-seat image IM2 is displayed on the screen for the P-seat operator (step ST24).

The television picture is displayed as the P-seat image and the navigation image is displayed as the D-seat image, for example, as shown in FIG. 17A, while the vehicle is moving. When the P-seat operator operates, the P-seat image IM2 is displayed on the screen for the P-seat operator according to the operation input, as shown in FIG. 17B and FIG. 17C. Meanwhile, the D-seat image IM1 keeps displaying the navigation image on the screen for the driver's seat. In this manner, even if the vehicle is moving, it is possible for the P-seat operator to operate the P-seat image IM2, whereas it is impossible for the D-seat operator to operate the D-seat image IM1. This enables safe driving.

In the above-described exemplary embodiments, the so-called multi-view display apparatus is configured in such a manner that the D-seat operator and the P-seat operator are detected to implement the display control process on the respective display screens. Meanwhile, the so-called single-view display apparatus may be configured in such a manner that the operation buttons such as a switch or the touch panel commonly used by the D-seat operator and the P-seat operator have different functions according to the respective operators, by use of the detection result of the D-seat operator and the P-seat operator.

In the above-described exemplary embodiments, the description has been given of a case where one of the D-seat operator and the P-seat operator operates. However, it is possible to imagine that, for example, the D-seat operator and the P-seat operator operate the various operation buttons almost simultaneously. In such a case, the operation priority or the like may be predetermined to one of the D-seat operator and the P-seat operator.

In the above-described exemplary embodiments, the description has been given of a case where the display on the screen is controlled by operating the operation buttons (operating portion). However, the present invention is not limited thereto, and is applicable to various functions such as audio output function, volume control function, or the like, in addition to the display function of the display apparatus.

In the above-described exemplary embodiments, the description has been given of the liquid crystal display apparatus mounted in a vehicle as an example. However, the present invention is not limited thereto, and is applicable to any in-vehicle display apparatus.

The description heretofore has been given of a case where the driver sits on a right-hand side in an automobile and the front-seat passenger sits on a left-hand side, however, the present invention is not limited thereto. The driver may sit on a left-hand side and the front-seat passenger may sit on a right-hand side in an automobile.

The present invention is not limited to the above-mentioned exemplary embodiments, and other embodiments, variations and modifications may be made without departing from the scope of the present invention.

The present invention is based on Japanese Patent Application No. 2005-341802 filed on Nov. 28, 2005, the entire disclosure of which is hereby incorporated by reference.

What is claimed is:

1. An in-vehicle display apparatus comprising:
   a display portion that respectively and simultaneously displays a first image visible in a first viewing direction for a driver and a second image visible in a second viewing direction for a front passenger on a common display;

an operating portion by which various functions are operated by use of the first image for the driver and the second image for the front passenger;

a signal outputting portion that respectively output different signals from the driver and the front passenger;

a signal receiving portion that receives the signals output from the signal outputting portion;

an operator detecting portion that detects which of the driver or the front passenger operates on the basis of the signals received by the signal receiving portion; and a controller that implements different processes, when the operator detecting portion detects that the driver operates the operating portion and when the operator detecting portion detects that the front passenger operates the operating portion, wherein the signal receiving portion is located to receive the signals from the signal outputting portion, when the driver or the front passenger touches the operating portion, and the first image and second image are full-screen during operation such that each of the first image and second image appears to encompass the entire common display when viewed from their respective viewing directions.

2. The in-vehicle display apparatus as claimed in claim 1, wherein the signal outputting portion includes a first signal outputting portion and a second signal outputting portion that are respectively provided for the driver and for the front passenger, the first signal outputting portion outputting a first signal, the second signal outputting portion outputting a second signal.

3. The in-vehicle display apparatus as claimed in claim 1, wherein the display portion is a Twisted Nematic liquid crystal display.

4. The in-vehicle display apparatus as claimed in claim 1, wherein the common display includes a touch panel responsive to physical contact.

5. The in-vehicle display apparatus as claimed in claim 4, wherein the touch panel is the signal receiving portion and receives the signals output from the signal outputting portion from a body of the driver or that of the front passenger after the signals have traveled through the body of the driver or that of the front passenger to determine which of the driver or the front passenger operates the operating portion when the driver or the front passenger contacts the touch panel.

6. The in-vehicle display apparatus as claimed in claim 5, wherein the touch panel is the operating portion and the various functions are performed by the driver or the front passenger touching commands displayed on the first image and second image, respectively.

7. The in-vehicle display apparatus as claimed in claim 1, further comprising a speed sensor that outputs a signal on the basis of the speed of the vehicle, wherein the controller determines whether the vehicle is moving on the basis of the signal output from the speed sensor, and when the operator detecting portion determines that the driver operates the operating portion, the controller rejects operations made by the driver and terminates processing and when the operating detecting portion determines that the front passenger operates the operating portion, the controller accepts operations made by the front passenger and performs processing.

8. An in-vehicle display apparatus comprising:

a display portion that respectively displays images on a first screen for a driver and on a second screen for a front passenger on a common display to be visible from a viewing angle of the driver and another viewing angle from the front passenger;

an operating portion by which various functions are operated by use of the first screen for the driver and the second screen for the front passenger;

a signal outputting portion that respectively output different signals between the driver and the front passenger;

a signal receiving portion that receives the signals output from the signal outputting portion;

an operator detecting portion that detects which the driver or the front passenger operates on the basis of the signals received by the signal receiving portion; and a controller that implements different processes, when the operator detecting portion detects that the driver operates the operating portion and when the operator detecting portion detects that the front passenger operates the operating portion, wherein the signals output from the signal outputting portion are received by the signal receiving portion through the driver or the front passenger.

9. The in-vehicle display apparatus as claimed in claim 8, wherein the signal outputting portion includes a first signal outputting portion and a second signal outputting portion that are respectively provided for the driver and for the front passenger, the first signal outputting portion outputting a first signal, the second signal outputting portion outputting a second signal.

10. The in-vehicle display apparatus as claimed in claim 9, wherein the first signal and the second signal are different from each other and the operator detecting portion determines which of the driver or the front passenger operates the display device by determining which of the first signal or second signal is received by the signal receiving portion.

11. The in-vehicle display apparatus as claimed in claim 9, wherein the first signal and the second signal are the same and the operator detecting portion determines which of the driver or the front passenger operates the display device by measuring the electrostatic capacitance of the operator on the based on the first signal and second signal received by the signal receiving portion.

12. The in-vehicle display apparatus as claimed in claim 8, wherein the signals are respectively output from the signal outputting portion through a body of the driver or that of the front passenger to the signal receiving portion to determine which of the driver or the front passenger operates the operating portion.

13. The in-vehicle display apparatus as claimed in claim 8, wherein when the operator detecting portion determines that the driver operates the operating portion, the controller performs processes that only affect the first image and when the operator detecting portion determines that the front passenger operates the operating portion, the controller performs processes that only affect the second image.

* * * * *